United States Patent
Watanabe et al.

(10) Patent No.: US 10,791,250 B2
(45) Date of Patent: Sep. 29, 2020

(54) IMAGE PROCESSING APPARATUS, IMAGE FORMING APPARATUS, AND IMAGE PROCESSING METHOD WHICH CORRECT TONE JUMP

(71) Applicants: Naoto Watanabe, Kanagawa (JP); Takashi Soma, Kanagawa (JP)

(72) Inventors: Naoto Watanabe, Kanagawa (JP); Takashi Soma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 15/597,867

(22) Filed: May 17, 2017

(65) Prior Publication Data
US 2017/0339317 A1    Nov. 23, 2017

(30) Foreign Application Priority Data

May 17, 2016 (JP) .................................. 2016-099059
Apr. 21, 2017 (JP) .................................. 2017-084687

(51) Int. Cl.
| | |
|---|---|
| H04N 1/60 | (2006.01) |
| H04N 1/407 | (2006.01) |
| H04N 1/405 | (2006.01) |

(52) U.S. Cl.
CPC .......... *H04N 1/6069* (2013.01); *H04N 1/405* (2013.01); *H04N 1/407* (2013.01)

(58) Field of Classification Search
CPC ....... H04N 1/6069; H04N 1/405; H04N 1/407
See application file for complete search history.

(56) References Cited

U.S. PATENT DOCUMENTS

| | | | | |
|---|---|---|---|---|
| 5,517,333 A | * | 5/1996 | Tamura | .................... H04N 5/20 |
| | | | | 348/234 |
| 6,233,062 B1 | * | 5/2001 | Takamatsu | .......... H04N 1/3877 |
| | | | | 358/461 |
| 2007/0036566 A1 | | 2/2007 | Takeuchi et al. | |
| 2007/0110455 A1 | | 5/2007 | Kamiizumi et al. | |
| 2007/0230979 A1 | | 10/2007 | Hasegawa et al. | |
| 2008/0025742 A1 | | 1/2008 | Kato et al. | |
| 2012/0062682 A1 | * | 3/2012 | Komai | ............. G03G 15/04018 |
| | | | | 347/118 |
| 2012/0155899 A1 | | 6/2012 | Watanabe et al. | |
| 2016/0223934 A1 | | 8/2016 | Watanabe et al. | |
| 2016/0234403 A1 | | 8/2016 | Watanabe et al. | |
| 2016/0274520 A1 | | 9/2016 | Soma et al. | |
| 2016/0274521 A1 | | 9/2016 | Iwata et al. | |
| 2016/0132013 A1 | | 12/2016 | Soma et al. | |

FOREIGN PATENT DOCUMENTS

JP    2015-023646    2/2015

* cited by examiner

*Primary Examiner* — Ruiping Li
(74) *Attorney, Agent, or Firm* — Oblon, McClelland, Maier & Neustadt, L.L.P.

(57) ABSTRACT

In an image processing apparatus gradation is represented by binary or multiple values. There is a memory to store correction information including a correction value corresponding to a position of image data. Correction circuitry corrects the image data according to the correction value. The number of bits representing the correction value for gradation is larger than the number of bits used to represent the image data.

10 Claims, 15 Drawing Sheets

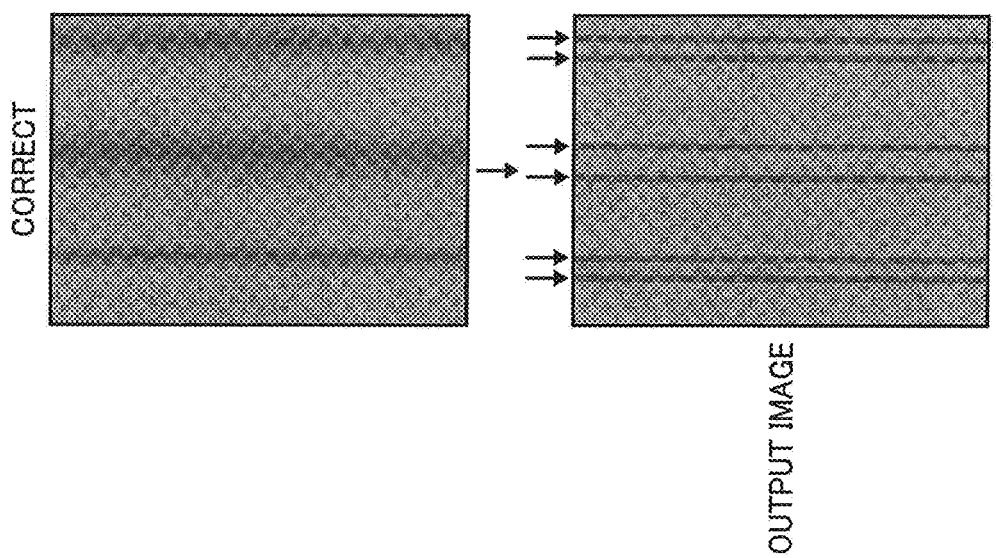
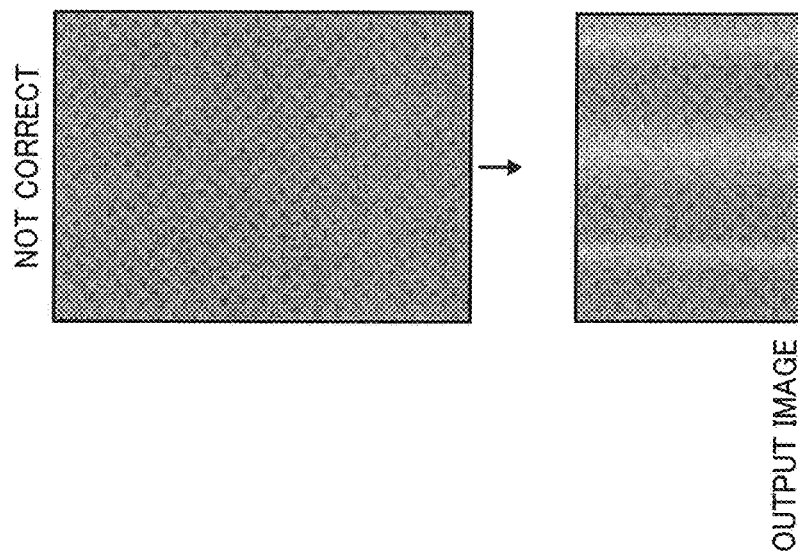

FIG. 6A

| 0 | 0 | −0.5 | 0 | 0 | 0.5 | 0 | 0 | 0 | 0 |
|---|---|---|---|---|---|---|---|---|---|
| 0 | 0 | −0.5 | 0 | 0 | 0.5 | 0 | 0 | 0 | 0 |
| 0 | 0 | −0.5 | 0 | 0 | 0.5 | 0 | 0 | 0 | 0 |
| 0 | 0 | −0.5 | 0 | 0 | 0.5 | 0 | 0 | 0 | 0 |
| 0 | 0 | −0.5 | 0 | 0 | 0.5 | 0 | 0 | 0 | 0 |
| 0 | 0 | −0.5 | 0 | 0 | 0.5 | 0 | 0 | 0 | 0 |
| 0 | 0 | −0.5 | 0 | 0 | 0.5 | 0 | 0 | 0 | 0 |
| 0 | 0 | −0.5 | 0 | 0 | 0.5 | 0 | 0 | 0 | 0 |

FIG. 6B

| 0 | 0 | −1 | 0 | 0 | 1 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | −1 | 0 | 0 | 1 | 0 | 0 | 0 | 0 |
| 0 | 0 | 0 | 0 | 0 | 0 | 0 | 0 | 0 | 0 |
| 0 | 0 | −1 | 0 | 0 | 1 | 0 | 0 | 0 | 0 |
| 0 | 0 | 0 | 0 | 0 | 0 | 0 | 0 | 0 | 0 |
| 0 | 0 | −1 | 0 | 0 | 1 | 0 | 0 | 0 | 0 |
| 0 | 0 | 0 | 0 | 0 | 0 | 0 | 0 | 0 | 0 |

FIG. 10

| 1 | 1 | 1 | 1 | 1 | 1 | 1 | 1 | 0 | 1 |
|---|---|---|---|---|---|---|---|---|---|
| 1 | 1 | 1 | 1 | 1 | 1 | 1 | 1 | 0 | 0 |
| 1 | 1 | 1 | 1 | 1 | 1 | 0 | 1 | 1 | 1 |
| 1 | 1 | 1 | 1 | 1 | 1 | 0 | 0 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |
| 1 | 1 | 1 | 1 | 1 | 1 | 1 | 1 | 1 | 1 |

FIG. 11

| 1 | 1 | 1 | 1 | 0 | 1 |
|---|---|---|---|---|---|
| 1 | 1 | 1 | 1 | 0 | 0 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

FIG. 12

| 0.25 | 0.75 | 0 | 0 | 0 | 0 |
|------|------|------|------|------|------|
| 0.25 | 0.75 | 0 | 0 | 0.25 | 0 |
| 0.25 | 0.75 | 0 | 0 | 0 | 0 |
| 0.25 | 0.75 | 0 | 0 | 0 | 0 |
| 0.25 | 0.75 | 0.25 | 0.25 | 0.25 | 0.25 |
| 0.25 | 0.75 | 0.25 | 0.25 | 0.25 | 0.25 |

FIG. 13

| 0.25 | 0.75 | 0 | 0 | 0 | 0 |
|------|------|------|------|------|------|
| 0.25 | 0.75 | 0 | 0 | 0 | 0 |
| 0.25 | 0.75 | 0 | 0 | 0 | 0 |
| 0.25 | 0.75 | 0 | 0 | 0 | 0 |
| 0.25 | 0.75 | 0.25 | 0.25 | 0.25 | 0.25 |
| 0.25 | 0.75 | 0.25 | 0.25 | 0.25 | 0.25 |

FIG. 15

| 1 | 0 | 0 | 0 | 0 | 0 |
|---|---|---|---|---|---|
| 0 | 0 | 0 | 0 | 0 | 0 |
| 1 | 0 | 0 | 0 | 0 | 0 |
| 0 | 0 | 0 | 0 | 0 | 0 |
| 1 | 0 | 1 | 0 | 1 | 0 |
| 0 | 0 | 0 | 0 | 0 | 0 |

FIG. 18A

| 0 | 0 | 0 | 0 | 0 | 0 | 0 | 0 | 0 | 0 |
|---|---|---|---|---|---|---|---|---|---|
| 0.75 | 0.75 | 0.75 | 0.75 | 0.75 | 0.75 | 0.75 | 0.75 | 0.75 | 0.75 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0.25 | 0.25 | 0.25 | 0.25 | 0.25 | 0.25 | 0.25 | 0.25 | 0.25 | 0.25 |
| 0 | 0 | 0 | 0 | 0 | 0 | 0 | 0 | 0 | 0 |
| 0 | 0 | 0 | 0 | 0 | 0 | 0 | 0 | 0 | 0 |
| −0.25 | −0.25 | −0.25 | −0.25 | −0.25 | −0.25 | −0.25 | −0.25 | −0.25 | −0.25 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 18B

IMAGE PROCESSING APPARATUS, IMAGE FORMING APPARATUS, AND IMAGE PROCESSING METHOD WHICH CORRECT TONE JUMP

CROSS-REFERENCE TO RELATED APPLICATIONS

The present application claims priority to and incorporates by reference the entire contents of Japanese Patent Application No. 2016-099059 filed in Japan on May 17, 2016 and Japanese Patent Application No. 2017-084687 filed in Japan on Apr. 21, 2017.

BACKGROUND OF THE INVENTION

1. Field of the Invention

The present invention relates to an image processing apparatus, an image forming apparatus, and an image processing method.

2. Description of the Related Art

Techniques are conventionally known for correcting density values of input image data in order to eliminate image defects which occur in the same direction as the feeding direction of a media (for example, paper) in an image forming apparatus.

For example, Japanese Patent No. 4661376 discloses a technique for correcting density values of input image data by obtaining not only the tone characteristic (relation between the input tone value and the output tone value) of each primary color printing image of primary colors (basic constituent colors) but also the tone characteristic of each primary color in printing an image of multi-primary colors in which a plurality of basic constituent colors are superimposed on each other, and then creating a correction table based on the obtained characteristics.

Incidentally, the tone gradation is not represented smoothly depending on the number of gradations of the image data. For example, it is impossible to connect all tone values smoothly when the tone values are represented 8 bit data. In this case, the difference of density values corresponding to the difference of the tone values in succession grows large due to a gradation change based on the correction table, and vertical streaks becomes more prominent.

SUMMARY OF THE INVENTION

In an image processing apparatus gradation is represented by binary or multiple values. There is a memory to store correction information including a correction value corresponding to a position of image data. Correction circuitry corrects the image data according to the correction value. The number of bits representing the correction value for gradation is larger than the number of bits used to represent the image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 2A and 2B are diagrams for explaining a problem of a prior art;

FIGS. 6A and 6B are diagrams for explaining an exemplary correction information;

FIG. 10 is a diagram for explaining an example of correction flag information.

FIG. 11 is a diagram for explaining an example of correction flag information.

FIG. 12 is a diagram for explaining an example of correction information.

FIG. 13 is a diagram for explaining a result of multiplying a correction flag and a correction value for each half tone cell.

FIG. 15 is a diagram for explaining final correction data.

FIGS. 18A and 18B are diagrams for explaining exemplary correction information.

DETAILED DESCRIPTION OF THE PREFERRED EMBODIMENTS

Embodiments of an image processing apparatus, an image forming apparatus, and an image processing method according to the present invention will be described in detail below with reference to the accompanying drawings. Although in the following description, a multifunction peripheral (MFP) will be described as an example of the image forming apparatus to which the present invention is applied, the image forming apparatus is not intended to be limited thereto. As used herein, the term "multifunction peripheral" refers to an apparatus having different functions including two or more of a copy function, a scanner function, a print function, and a facsimile function.

An overview of the present embodiment will be described prior to description of specific contents. An image forming apparatus carries out the screening process to make image data represented by 8 bit data which provides 256 gradations).

Figure 1:
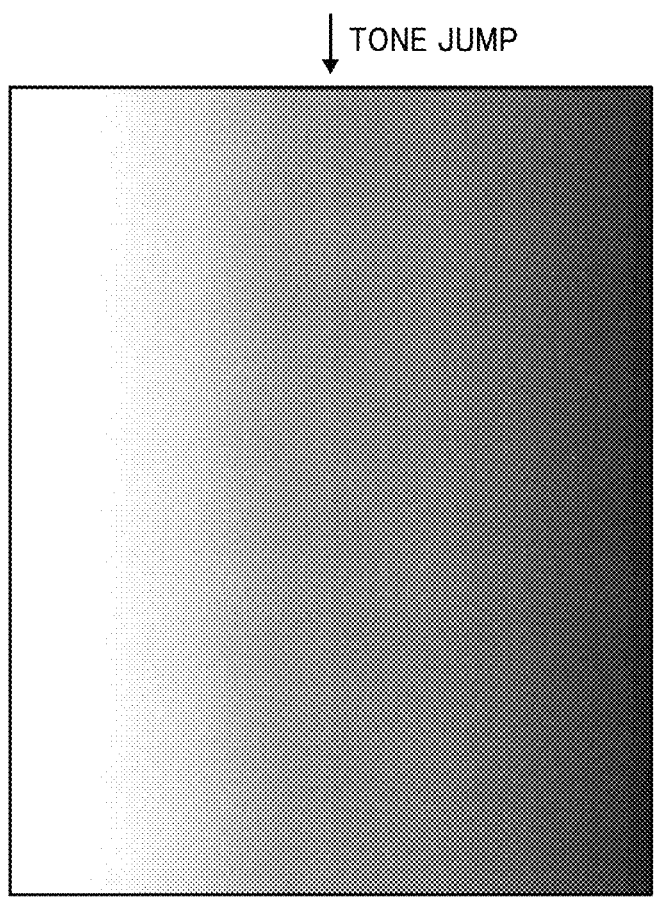
FIG. 1 is a diagram for explaining a tone jump.

However as illustrated in FIG. 1, it is difficult to connect all steps of the tone values smoothly when the tone values are represented by 8 bit data and it is possible to provide a step of tone value. We refer to this step of tone value as "tone jump".

An image forming apparatus rarely can represent gradation by tone of one pixel. Usually as representative off-set printing, one pixel represents only 1 bit information (binary information). Therefore, an image forming apparatus such as off-set printing and electrophotography adopt an area gradation method using a dither matrix (half-tone cell).

An image forming apparatus is commonly arranged to form a print image of 8 bit (256 gradations) by processing input image data of 8 bit (256 gradations) by an area gradation method using a dither matrix (half tone cell). However when an image forming apparatus converts an input image data to correct an image defect, small streaks are caused by a tone-jump and image quality becomes worse than an image quality of the input image data before converted, if the input image data before converted includes the tone jump.

When an image forming apparatus converts an input image data of a gradation image, the tone jump may occur around a uniform intermediate gradation image, and small streaks tend to occur as a result of the conversion, as shown in FIG. 2A. Because a gradation of the input image is not changed, the tone jump does not appear in a uniform intermediate gradation image without the converting, as shown in FIG. 2B. However a gradation of the input image is changed by the converting, and the tone jump appears in a uniform intermediate gradation image.

Figure 3:
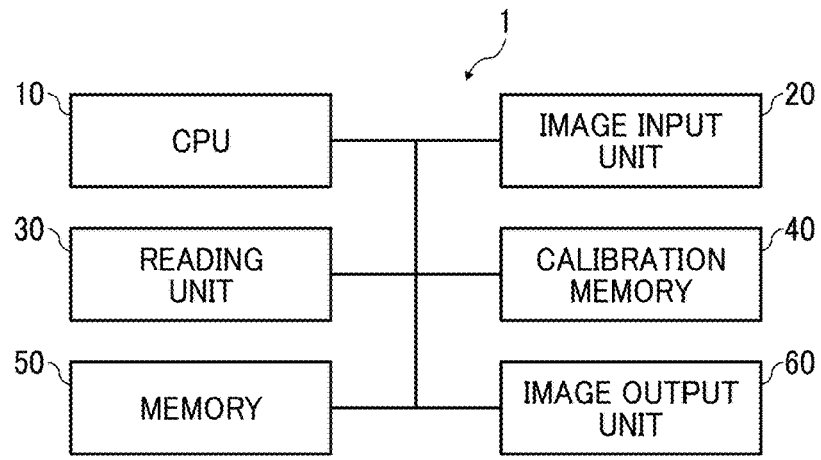
FIG. 3 is a diagram for explaining an exemplary hardware configuration of an MFP.

FIG. 3 is a diagram illustrating an exemplary hardware configuration of an MFP 1 of the present embodiment. As illustrated in FIG. 3, the MFP 1 includes a CPU (Central Processing Unit or Processor) 10, an image input unit 20, a reading unit 30, a calibration memory 40, a memory 50, and an image output unit 60.

Figure 4:
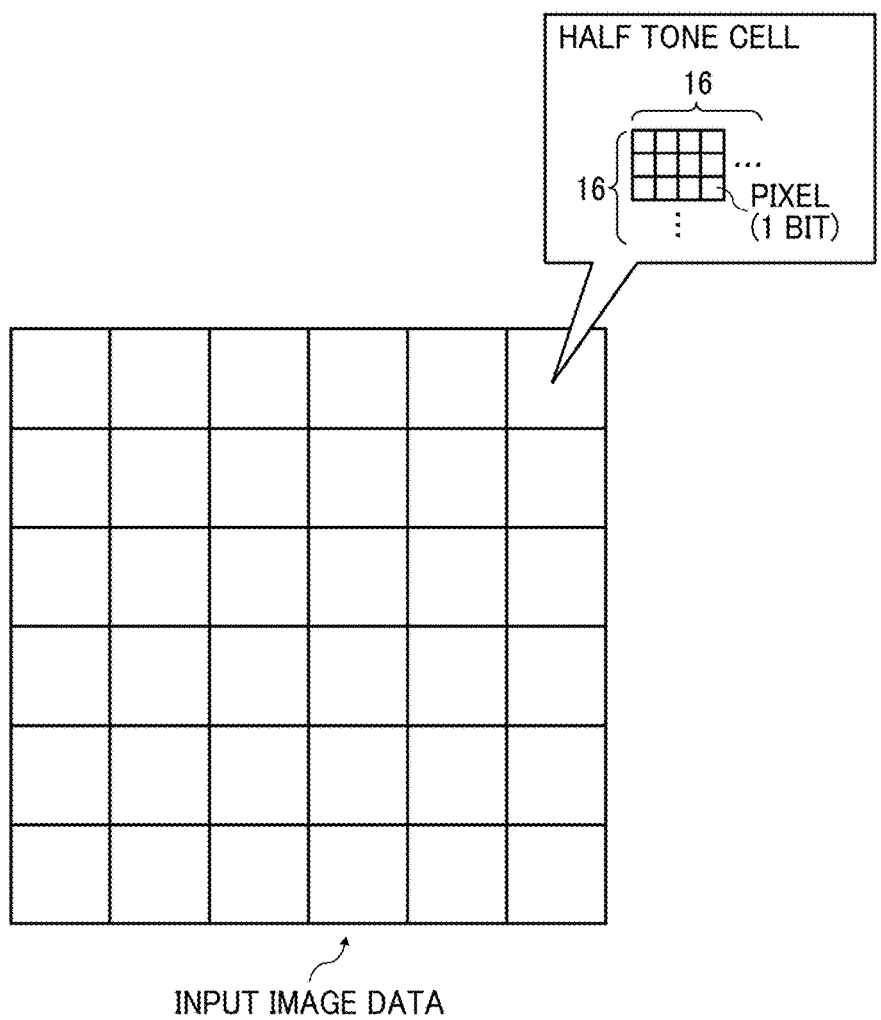
FIG. 4 is a diagram for explaining input image data.

The CPU 10 centrally controls the operation of the entire MFP 1. The functions of the CPU 10 will be described later. The image input unit 20 receives image data from a host device, and may be a communications interface, bus, or port, for example. In the following description, the image data received from the host device may be referred to as "input image data". In this example, input image data is an image data represented by an 8 bit gradation. More specifically, as illustrating in FIG. 4, the input image data includes half-tone cell, a set of pixels each of which represents binary or more gradation (a set of 16*16=256 pixels in FIG. 4).

Returning to FIG. 3, the reading unit 30 is a device for optically reading an image formed on a recording medium (for example, paper) by the image output unit 60 and may be implemented by a scanner or a camera and may use an optical sensor such as a CCD, a CMOS sensor or line sensor, for example, under the control of the CPU 10. A variety of known configurations of scanners can be used as the configuration of the reading unit 30.

The calibration memory 40 is a device that stores therein test pattern images in advance for use in calibration processing described later. The calibration memory 40 may be implemented by a non-volatile memory, for example.

The memory 50 stores therein correction information obtained in calibration processing and may be implemented as a nonvolatile memory, if desired.

More specifically, the memory 50 stores therein correction information in which a correction value has gradation value larger than gradation value of half-tone cell and for obtaining a target output value corresponding to one of a plurality of positions in the main scanning direction of the image data. More specific contents will be described later. As used herein, the term "main scanning direction" refers to the direction orthogonal to the feeding direction of a recording medium (in this example, paper).

The image output unit 60 is a device for forming or generating image data and a test pattern image stored in the calibration memory 40 on a recording medium under the control of the CPU 10. More specifically, the image output unit 60 is a device for fixing a toner image on a recording medium in accordance with image data such as input image data, and a test pattern image data stored in the calibration memory 40. Thus the image output unit 60 may be implemented as a printer or printing engine, and is equipped with CMYK toners and includes, for each toner, an image forming unit including a photoconductor, a charger, a developing device, a photoconductor cleaner, an exposure unit, and a fixing device. The image output unit 60 emits a light beam from the exposure unit in accordance with image data to form a toner image corresponding to each toner on the photoconductor, and then transfers the toner image formed on the photoconductor onto an intermediate transfer belt (primary transfer). The image output unit 60 then transfers the toner image transferred on the intermediate transfer belt onto a recording medium (secondary transfer), and fixes the toner image transferred on the recording medium with the fixing device by heating and pressing at temperatures in a predetermined range. An image is thus formed on the recording medium. Such a configuration of the image output unit 60 is well known and a detailed description thereof is omitted here. A variety of known configurations of printer engines can be used as the configuration of the image output unit 60. It should be noted that the recording medium may not be paper.

Figure 5:
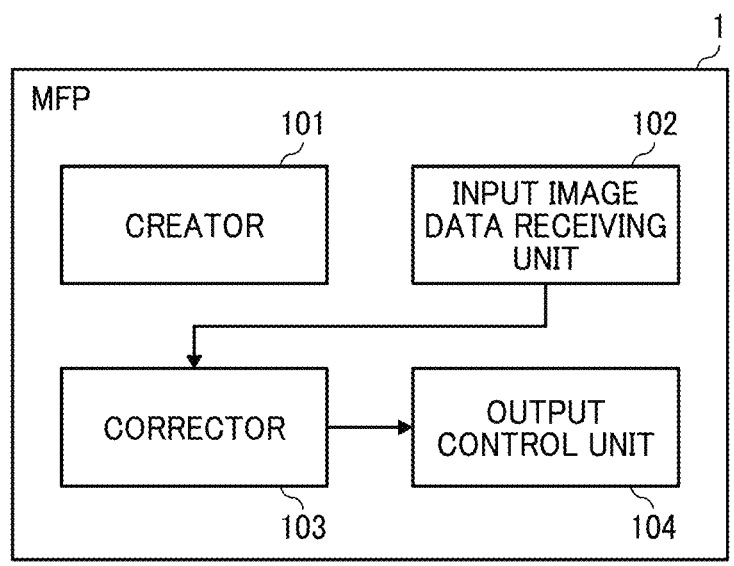
FIG. 5 is a diagram for explaining exemplary function of an MFP.

FIG. 5 is a diagram illustrating exemplary functions of the MFP 1 includes a creator 101, an input image data receptor unit 102, a corrector 103, and an output control unit 104. Although for convenience of explanation, the functions pertaining to the present invention are mainly illustrated in the example in FIG. 5, the functions of the MFP 1 are not intended to be limited to those functions.

The creator 101 creates correction information. In the present embodiment, the creator 101 creates the correction information to include a correction value, the number of gradations of which is larger than the image data for obtaining a target output value corresponding to at a position which along with main direction of image data by calibration. For example, the creator 101 creates correction information based on the read brightness of a plurality of test patterns obtained by forming a plurality of test pattern images on a record medium. More specifically describing the acquisition of the correction value, it is not necessary to acquire the correction value during printing, so it may be done offline. The image output unit 60 of the MFP 1 (digital printing machine) outputs a chart having a uniform density in a direction perpendicular to the paper feeding direction. In the chart, a plurality of colors of the process color and the gradation of each color are incorporated and output without correction. At this time, the density unevenness generated from the MFP 1 is output on the output chart. The outputted chart is read by the scanner, and unevenness and streaks in the paper feeding direction of the MFP 1 are read for each color and each gradation. Then, the correction value is calculated so as to cancel out the read unevenness and the streak data.

In the present embodiment, gradation of correction information is 9 bit, or 512 gradations, and larger than the image data (8 bit). However it should be noted that the gradation of the correction information may not be 9 bit and may be larger or smaller, as desired.

According to one implementation, the correction value "1" at 9 bit corresponds to the correction value "1" at 8 bit (it means the gradation value of image data increases "1") and the correction value at 9 bit is available per "0.5" and in a range of −127 to 127, for a total 512 gradation values.

FIG. 6A is a diagram illustrating exemplary correction information. As illustrated in FIG. 6A, the correction information may be Look-Up-Table (LUT) format information that has 9 bit correction value corresponding to each half-tone cell of the input image data.

The input image data receptor unit 102 receives input image data from a host unit. The corrector 103 corrects the input image data the input image data unit received based on the correction information created by the creator 101.

The corrector 103 treats a plurality of adjacent half-tone cells along the sub-scanning direction as one complex half-tone cell and corrects the gradation value of the complex half-tone cell based on the correction information. The correction information has the correction value of "−0.5" corresponding to 3rd line from left to right in FIG. 6A.

In present embodiment, one half tone cell can describe 8 bit gradation. On the other hand, 9 bit gradation ($2^8*2=2^9$ gradation) is desired to correct the value of gradation by "−0.5". In this case, two 8 bit half tone cells make up one complex half tone cell.

The corrector 103 corrects the gradation value of two half tone cells of 8 bit data forming the complex half tone cell having a different value to gain 9 bit correction value into one complex half tone cell.

As mentioned above, if the correction value is "−0.5" in 9 bit, the corrector 103 corrects the gradation value of one of the two half tone cells of the complex half-tone cell at "0" and corrects the gradation value of another at "−1" in 8 bit (FIG. 6B).

The correction is performed such that the two adjacent half tone cells having different correction values can avoid that corrected parts those have the same correction value are in alignment and avoid a tone jump is caused as a result of the correction.

Returning to FIG. 5, the output control unit 104 controls outputting the input image data corrected by the corrector 103. More specifically, the output control unit 104 controls the image output unit 60 to form a toner image, based on the input image data corrected by the corrector 103, on a recording medium.

In the present embodiment, the functions of the creator 101, the input image data receptor unit 102, the corrector 103, and the output control unit 104 described above are implemented by the CPU 10 executing a computer program stored in, for example, the memory 50. The CPU may be considered circuitry or processing circuitry, as a processor includes therein circuits, Alternatively, for example, at least some of the functions of the color creator 101, the input image data receptor unit 102, the corrector 103, and the output control unit 104 may be implemented by a dedicated hardware circuit, also considered circuitry (for example, a semiconductor integrated circuit). Alternatively, for example, a plurality of CPUs 10 may be provided, and the functions of the creator 101, the input image data receptor unit 102, the corrector 103, and the output control unit 104 may be distributed over the CPUs 10.

Figure 7:
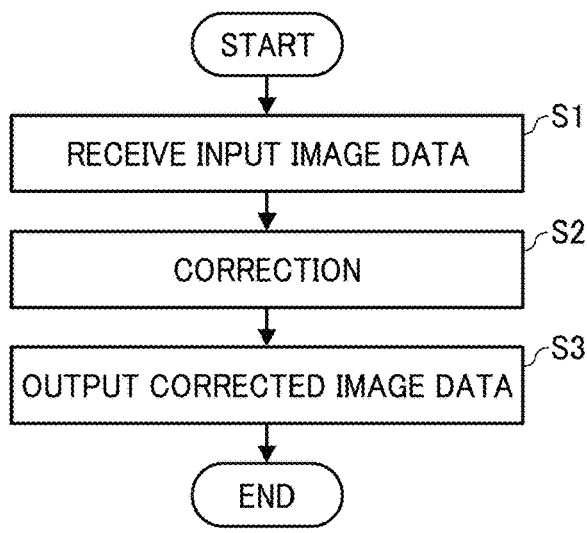
FIG. 7 is a flowchart for explaining the flow of a process performed by an MFP.

FIG. 7 is a flowchart illustrating exemplary operation of the MFP 1. First, the input image data receptor unit 102 receives the input image data from a host device (step S1). The corrector 103 corrects the input image data received at S1 based on the correction information (step S2). The output control unit 104 controls the outputting of the image data corrected at S2 (step S3).

As described above, in present embodiment, the gradation of the correct information can be corrected without causing a visible difference of tone by the correction information the number of gradation of which is larger than the image data. That is, in present embodiment, gradation (tone jump) occurring as a result of a correction of a vertical streak can be suppressed.

Second Embodiment

In the second embodiment, an example of a method of specifying a correction target and a method of calculating a correction value will be described in more detail.

Figure 8:
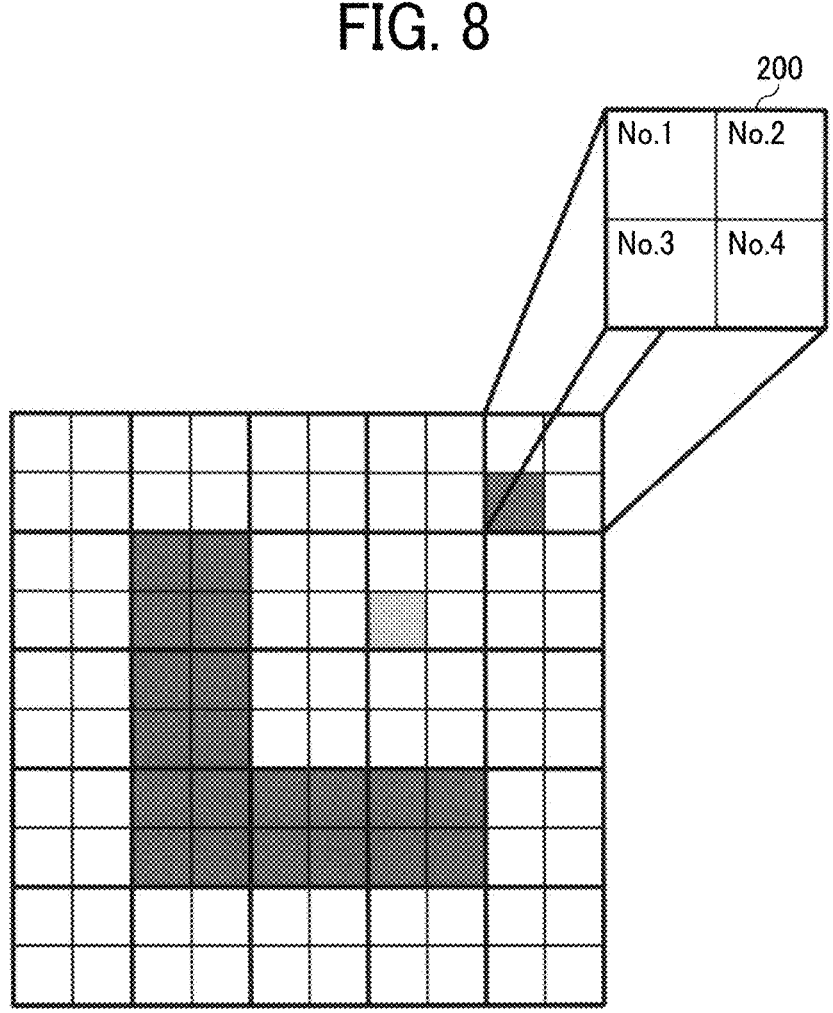
FIG. 8 is a diagram for explaining a unit of a complex half tone cell used for area gradation processing in input image data.

At illustrated in FIG. 8, the frames enclosed by the bold line represents a unit of a complex half tone cell used for the correction (the frame surrounded by thin lines corresponds to one half tone cell). In FIG. 8, the frames, such as frame 200, include a 2×2 arrangement of half tone cells, or four half tone cells. In this embodiment, it is judged for each of the complex halftone cells whether or not it is a correction target. When the density of a half tone cell such as a cell to be judged has a same value as a value of both a cell neighboring in a horizontal direction and a cell neighboring in a vertical direction, the half tone cell to be judged (e.g., a judgment target half tone cell) is determined to be as a correction target and a correction flag for that cell is set to 1. For example, In the 2×2 array 200 illustrated in FIG. 8, the correction flag for cell No. 2 is set or set to 1 because neighboring cell No. 1 in the horizontal direction has a same value, and neighboring cell No. 4 in the vertical direction has a same value. The correction flag is not set for cells No. 1, No. 3, and No. 4, as none of these cells has both horizontally and vertically neighboring cells with the same value.

Figure 9:
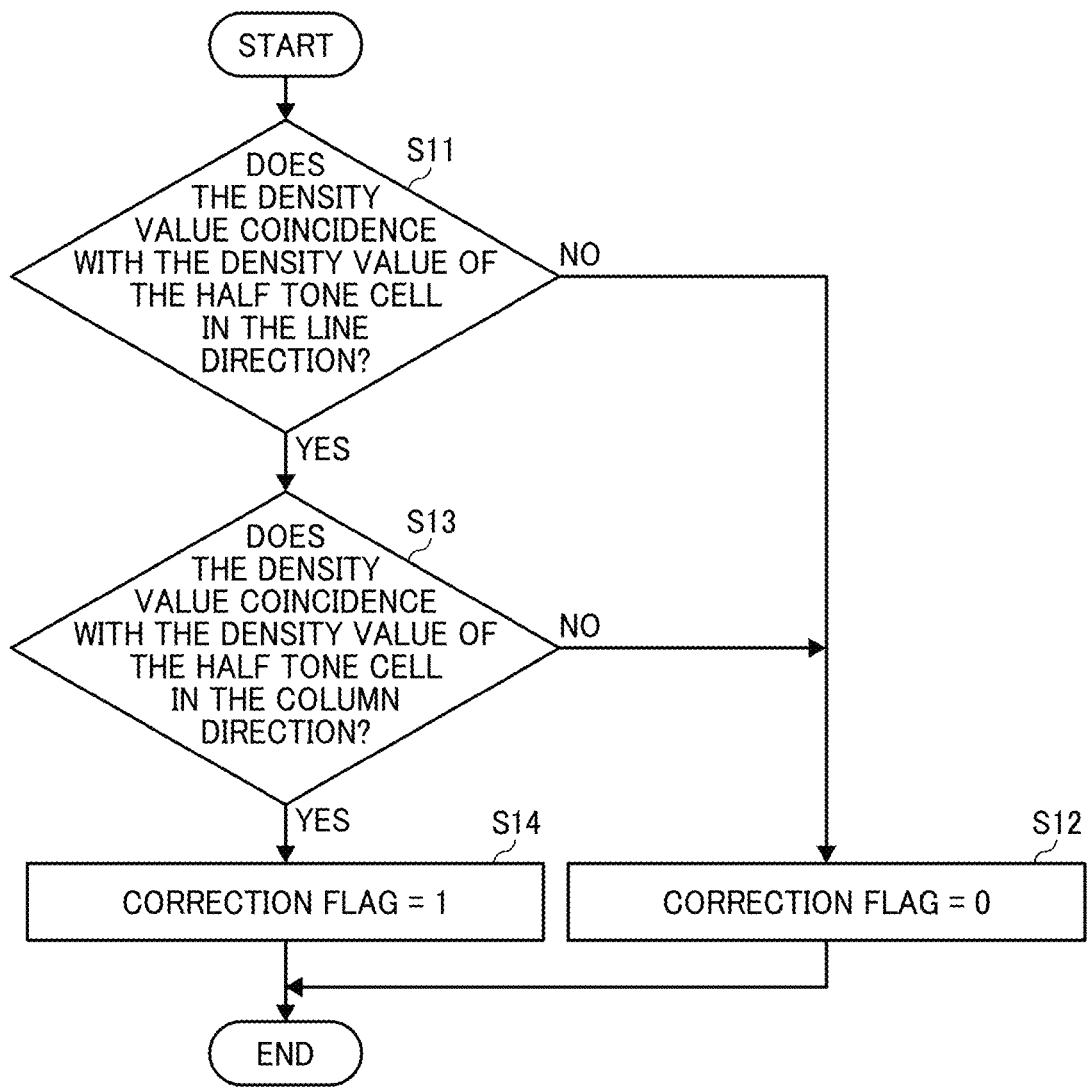
FIG. 9 is a flowchart for explaining an example of a process of judging whether or not it is a correction target for each half tone cell included in one complex half tone cell.

FIG. 9 is a flowchart showing an example of a process of judging whether or not an object is a correction object for each half tone cell.

As shown in FIG. 9, the corrector 103 judges whether or not a density value of a judgment target half tone cell coincides with the density value of a half tone cell adjacent in the line direction to the judgment target half tone cell among the four half tone cells constituting one complex half tone cell including the judgment target half tone cell (step S11). When the result of step S11 is negative (step S11: No), the correcting unit 103 determines that the judgment target halftone cell is not a correction target and sets the correction flag to "0" (step S12).

When the result of step S11 is positive (step S11: Yes), the corrector 103 judges whether or not a density value of a judgment target half tone cell coincides with the density value of a half tone cell adjacent in the column direction to the judgment target half tone cell among the four half tone cells constituting one complex half tone cell including the judgment target half tone cell (step S13). When the result of step S13 is negative (step S13: No), the process proceeds to the above-described step S12. On the other hand, when the result of step S13 is positive (step S13: Yes), the correcting unit 103 judges that the judgment target half tone cell is a correction target and sets the correction flag to "1" (step S14).

With reference to FIG. 8, a judgment example for the complex half tone cell 200 at the upper right of FIG. 8 will be described.

The half tone cell in the first line and first column of this complex half tone cell 200 is referred to as "No. 1 half tone cell", the half tone cell in the first line and second column is referred to as "No. 2 half tone cell", the half tone cell in the second line and the first column is referred to as "No. 3 half tone cell", and the half tone cell in the second line and the second column is referred to as "No. 4 half tone cell". In this example, it is assumed that the density value of "No. 3 half tone cell" is "gray" and the density value of the other half tone cell is "white".

The density value of "No. 1 half tone cell" is the same as the density value of "No. 2 half tone cell" adjacent in the line direction (density value indicating white), but the density value adjacent to "No. 3 half tone cell" shows gray and the density value is different. Therefore, "No. 1 halftone cell" is not a correction target (the correction flag is set to "0").

The density value of "No. 2 half tone cell" is the same as the density value of "No. 1 half tone cell" adjacent in the line direction (density value indicating white), and is the same as the density value of "No. 4 half tone cell" adjacent in the column direction. Therefore, "No. 2 halftone cell" is a correction target (the correction flag is set to "1").

The density value of "No. 3 half tone cell" is different from the density value of "No. 4 half tone cell" adjacent in the line direction, and is also different from the value of "No. 1 halftone cell" adjacent in the column direction. Therefore, "No. 3 halftone cell" is not a correction target (the correction flag is set to "0").

The density value of "No. 4 halftone cell" is the same as the density value of "No. 2 halftone cell" adjacent in the column direction, but the density value of "No. 3 half tone cell" is gray, and the density values are different. Therefore, "No. 4 halftone cell" is not a correction target (the correction flag is set to "0").

The above judgment is performed for all half tone cells, a state in which the correction target is represented by "1" (correction flag is set to "1"), and the outside of correction is indicated by "0" (correction flag set to "0") is shown in FIG. 10. Information corresponding to a set correction flag for each halftone cell, as shown in FIG. 10, is referred to as "correction flag information".

Next, a method of determining a correction value for a correction actually performed from correction flag information and correction information will be described. FIG. 11 is a diagram showing an example of correction flag information. FIG. 12 is a diagram showing an example of correction information, and the correction information in this example is information indicating correction values (extra information after 8 bit correction in this example) for each half tone cell.

In this embodiment, the corrector 103 obtains the product of the correction flag and the correction value indicated by the correction information for each half tone cell. FIG. 13 is a diagram showing the result of multiplying the correction flag and the correction value for each half tone cell using the correction flag information shown in FIG. 11 and the correction information shown in FIG. 12.

In this embodiment, using the values of the odd line and odd columns (the first line and the first column of the complex halftone cell), four correction values corresponding to the four halftone cells constituting the complex half tone cell are determined.

Figure 14:
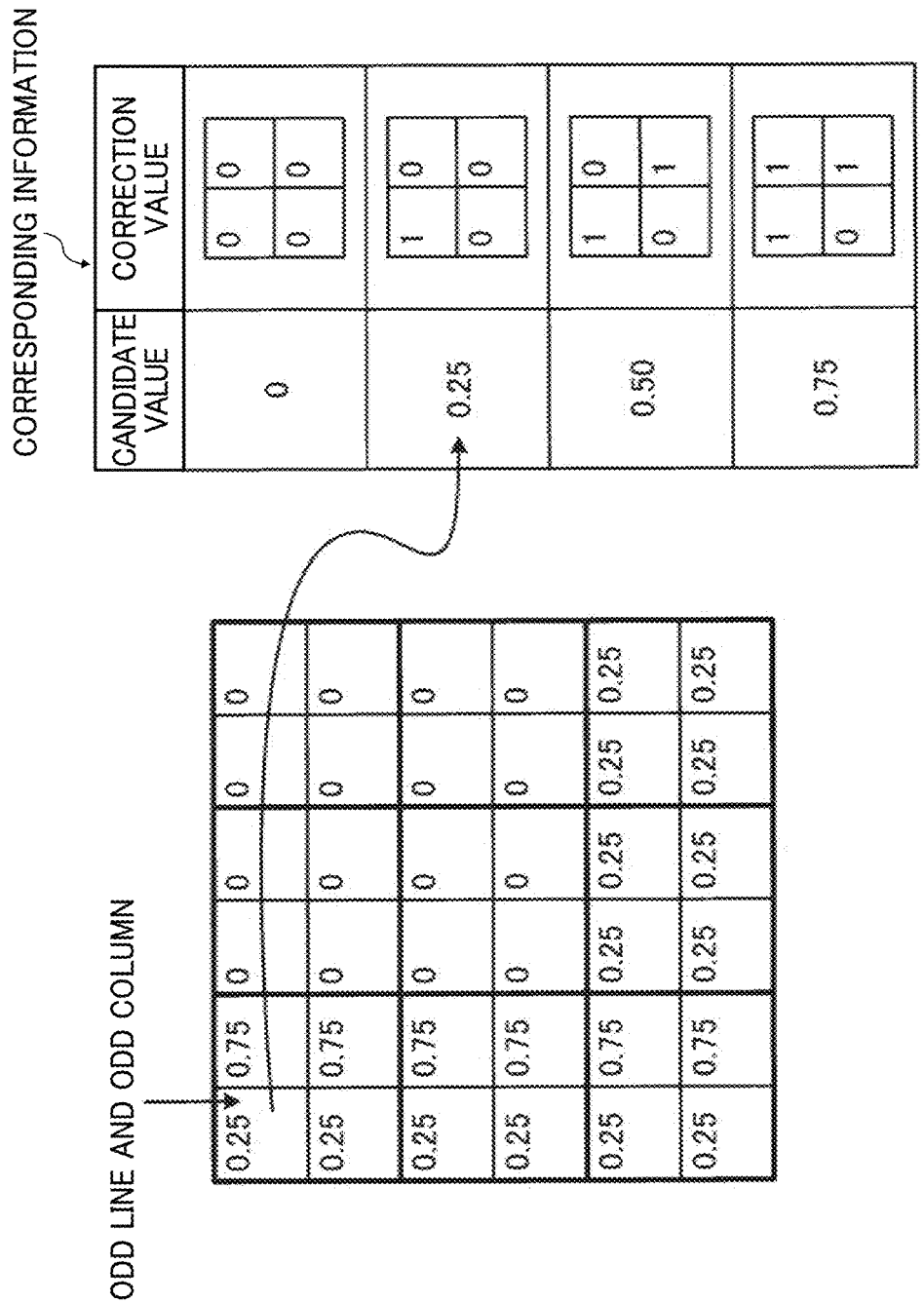
FIG. 14 is a diagram for explaining an example of correspondence information.

Here, correspondence information in which candidate values of correction values that can be taken by half tone cells of odd-numbered lines and odd-numbered columns are associated with correction values for correction actually performed of respective four half tone cells constituting a complex half tone cell is shown in FIG. 14B. With reference to this correspondence information, a final correction value (correction value of each half tone cell) corresponding to candidate values of halftone cells of odd-numbered lines and odd-numbered columns (multiplication result of correction flag and correction value) is obtained for each complex half tone cell. In the case of the complex half tone cell in the upper left corner of FIG. 14A, since the candidate value of the odd-numbered line odd-numbered column is 0.25, it is the second correction value from the top of the table of FIG. 14B.

In this way, the correction value for correction actually performed of each halftone cell can be determined. In this embodiment, the values of the halftone cells of odd-numbered lines and odd-numbered columns are used for determining the correction value for correction actually performed, but values of half tone cells at other positions may be used.

FIG. 15 is a diagram showing final correction data including the correction value for correction actually performed of each half tone cell in the above embodiment. And this correction value for correction actually performed is added to the original image (input image data).

Figure 16A:
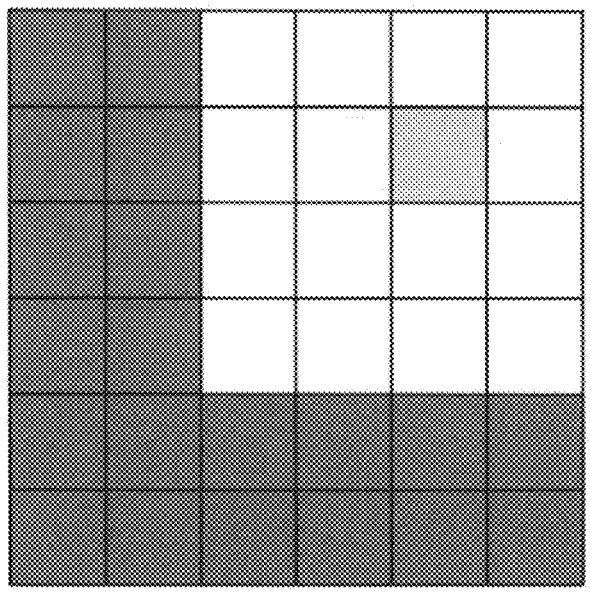
FIGS. 16A and 16B are diagrams for explaining an image of image data before and after correction.
Figure 16B:
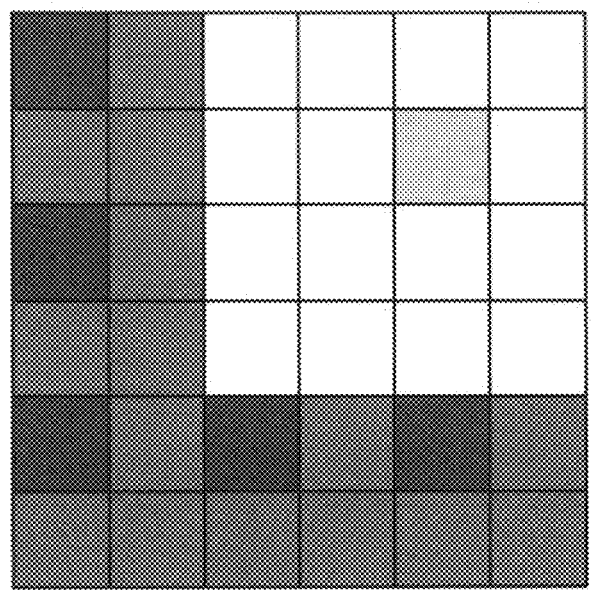

FIG. 16A is a conceptual diagram of input image data before correction, and FIG. 16B is a conceptual diagram after correction.

Figure 17:
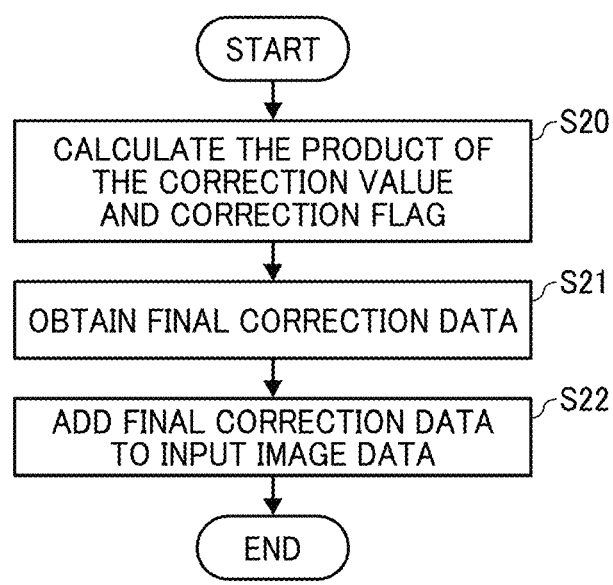
FIG. 17 is a flowchart for explaining an example of a process in the case where correction is performed by finding the final correction data.

FIG. 17 is a flowchart showing an example of a process in the case where correction is performed by finding the final correction data. As shown in FIG. 17, the corrector 103 obtains the product of the correction value and the correction flag for each halftone cell (step S20). Next, the correcting unit 103 obtains the final correction data using the correspondence information (step S21). Specific details are as described above. Next, the corrector 103 adds the final correction data to the input image data (step S22).

Third Embodiment

A third embodiment will now be described. In this embodiment, the corrector 103 increases a resolution of a half-tone cell allocated the value of correction corresponding to the correction information. Then, the corrector 103 corrects the gradation value of the half tone with increased resolution based on the correction value.

In the first embodiment, two adjacent half tone cells were treated as one complex half-tone cell to create 9 bit correction data and increase the resolution of the gradation value. However it is necessary to use more half-tone cells to create the larger bit correction values. For example, as in the second embodiment, four half-tone cells are required to create 10 bit correction value to correct 8 bit input image data. When the resolution of the input image data is 300 dpi, the total size of the four half tone cells is 0.34 mm.

Especially in the case of image data of high resolution such as 1200 dpi, there is no particular problem even if four halftone cells are used as one complex half tone cell. However, in the case of image data of 300 dpi, for example, when the observer observes an image from a position 300 mm apart, the sensitivity to the density fluctuation with a period of about 1 mm/cycle is high, and the period of about 0.3 mm/cycle is also easily perceived.

If the size of the complex half tone cells is increased, a cycle of density change might be easily visible according to the density change cycle.

In order to solve the problem above, in the present embodiment, the corrector 103 increases a resolution of a half-tone cell twice, 600 dpi, to reduce the size of the complex half tone cell to 0.17 mm and corrects the input image data at 0.17 mm/cycle of density change cycle.

Figure 18B:
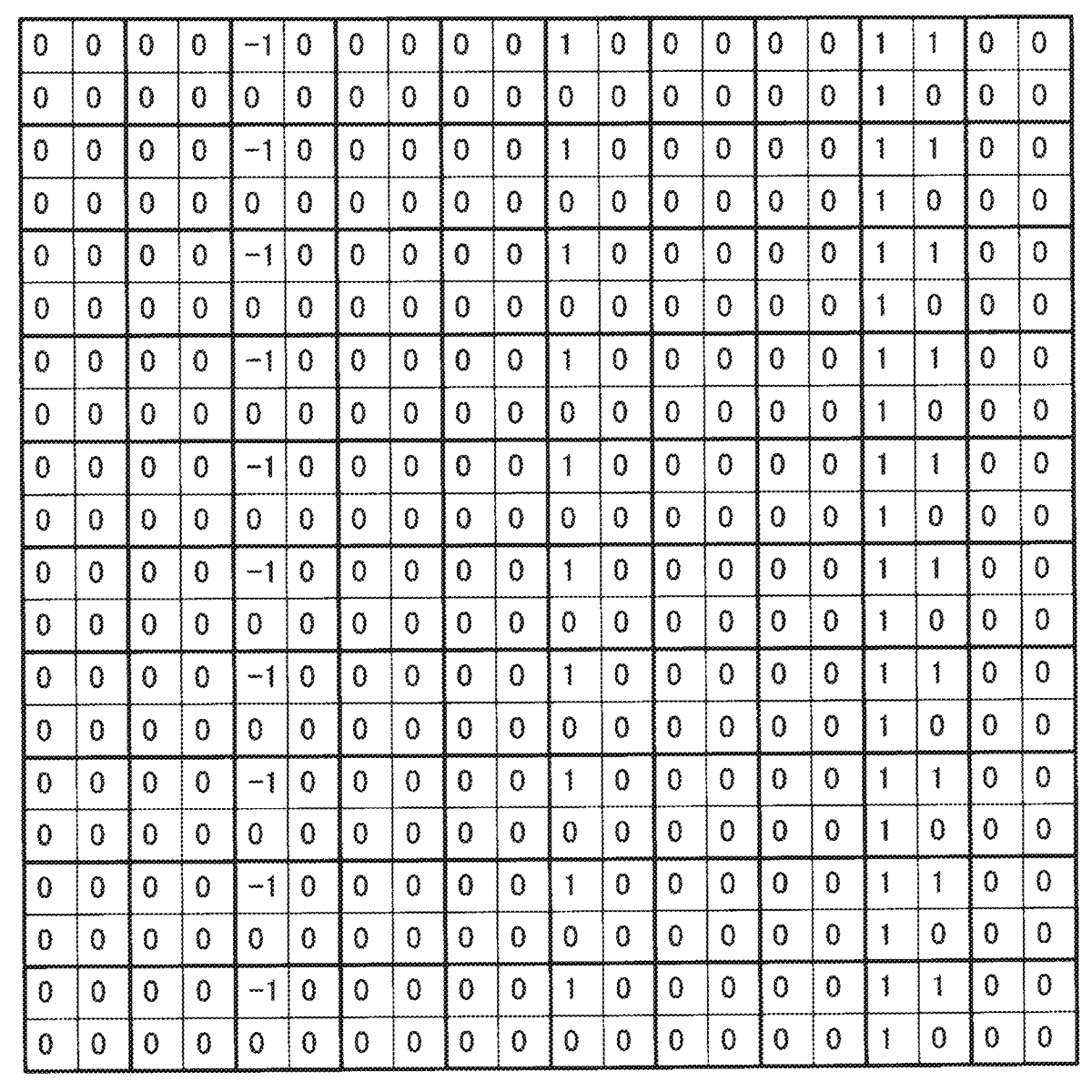

FIG. 18A is a diagram illustrating exemplary correction information before a resolution of which is increased (ex. 300 dpi) and FIG. 18B is a diagram illustrating exemplary correct information a resolution of which is increased (ex. 600 dpi).

The correction value "0.25" in the sixth line from the left in FIG. 18A corresponds to the sixth unit line from the left in FIG. 18B, and here (upper left, upper right, lower left, lower right) In the order of (1, 0, 0, 0).

A correction value: −0.75 (300 dpi) is represented by using 2*2=4 pixels at 600 dpi, for example, [−1, −1, −1, 0] (FIG. 8B). Similarly, a correction value: −0.5 (300 dpi) is represented by using 2*2=4 pixels at 600 dpi, for example, [−1, −1, 0, 0].

A correction value: −0.25 (300 dpi) is represented by using 2*2=4 pixels at 600 dpi, for example, [−1, 0, 0, 0].

A correction value: 0.25 (300 dpi) is represented by using 2*2=4 pixels at 600 dpi, for example, [1, 0, 0, 0].

A correction value: 0.5 (300 dpi) is represented by using 2*2=4 pixels at 600 dpi, for example, [1, 1, 0, 0].

A correction value: 0.75 (300 dpi) is represented by using 2*2=4 pixels at 600 dpi, for example, [1, 1, 1, 0].

That is, in present embodiment, a step of gradation (tone jump) which occurs as a result of a correction of a vertical streak and sensibility of density change can be suppressed.

Although embodiments according to the present invention have been described above, the present invention is not intended to be limited to the foregoing embodiments as they are, but the components may be modified and implemented in a practical stage without departing from the spirit of the invention. A variety of inventions can be formed by appropriately combining a plurality of components disclosed in the foregoing embodiments. For example, some of the components illustrated in the embodiments may be deleted. Components in different embodiments may be appropriately combined with each other.

The computer program executed in the MFP 1 (the CPU 10) in the foregoing embodiments may be configured so as to be provided as a file in an installable form or an executable form recorded on a computer-readable recording medium such as compact disc-read-only memory (CD-ROM), flexible disk (FD), compact disc-recordable (CD-R), digital versatile disc (DVD), and universal serial bus (USB) memory, or may be provided or distributed via a network such as the Internet. Alternatively, computer programs built in a read-only memory (ROM) may be provided.

An embodiment can correct density values of input image data with a simpler configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, in which gradation is represented by binary or multiple values, comprising:
a memory to store correction information including correction value data corresponding to a position of image data;
correction circuitry configured to correct gradation of the image data according to the correction value data; and
a printer configured to form an image on a recording medium based on the corrected gradation of the image data, wherein
a number of bits used to represent the correction value data for the gradation is larger than a number of bits used to represent the image data,
the image data represents gradation by a half-tone cell that includes a set of pixels,
the correction circuitry is further configured to determine whether a particular half-tone cell is a correction target or not, and correct values of pixels in the particular half-tone cell, when determining that the particular half-tone cell is the correction target, and
the correction circuitry is further configured to determine that the particular half-tone cell is the correction target when determining that (1) a density value of the particular half-tone cell is a same value as a density value of a first half-tone cell adjacent in a sub scan direction, and (2) the density value of the particular half-tone cell is a same value as a density value of a second half-tone cell adjacent in a main scanning direction orthogonal to the sub scan direction.

2. The image processing apparatus according to claim 1, wherein the correction circuitry is further configured to correct a value of a pixel within a group of pixels based on neighboring pixel values for pixels that are adjacent in the sub scan direction orthogonal to the main scan direction.

3. The image processing apparatus according to claim 1, wherein the correction circuitry is further configured to increase a resolution of the half-tone cell and correct a value of a pixel of the resolution-increased half-tone cell.

4. An image processing apparatus, in which gradation is represented by binary or multiple values, comprising:
means for storing correction information including correction value data corresponding to a position of image data;
means for correcting gradation of the image data according to the correction value data; and
means for forming an image on a recording medium based on the corrected gradation of the image data, wherein
a number of bits used to represent the correction value data for the gradation is larger than a number of bits used to represent the image data,
the image data represents gradation by a half-tone cell that includes a set of pixels,
the means for correcting includes means for determining whether a particular half-tone cell is a correction target or not, and correcting values of pixels in the particular half-tone cell, when determining that the particular half-tone cell is the correction target, and
the means for determining determines that the particular half-tone cell is the correction target when determining that (1) a density value of the particular half-tone cell is a same value as a density value of a first half-tone cell adjacent in a sub scan direction, and (2) the density value of the particular half-tone cell is a same value as a density value of a second half-tone cell adjacent in a main scanning direction orthogonal to the sub scan direction.

5. The image processing apparatus according to claim 4, wherein the means for correcting corrects a value of a pixel within a group of pixels based on neighboring pixel values for pixels that are adjacent in the sub scan direction orthogonal to the main scan direction.

6. The image processing apparatus according to claim 4, wherein the means for correcting increases a resolution of the half-tone cell and corrects a value of a pixel of the resolution-increased half-tone cell.

7. An image processing method, in which gradation is represented by binary or multiple values, comprising:
reading, from a memory, correction information including correction value data corresponding to a position of image data,
correcting gradation of the image data according to the correction value data, and forming an image on a recording medium based on the corrected gradation of the image data, wherein a number of bits used to represent the correction value data for the gradation is larger than a number of bits used to represent the image data, the image data represents gradation by a half-tone cell that includes a set of pixels, the correcting step further includes determining whether a particular half-tone cell is a correction target or not, and correcting values of pixels in the particular half-tone cell, when determining that the particular half-tone cell is the correction target, and the correcting step further includes determining that the particular half-tone cell is the correction target when determining that (1) a density value of the particular half-tone cell is a same value as a density value of a first half-tone cell adjacent in a sub scan direction, and (2) the density value of the particular half-tone cell is a same value as a density value of a second half-tone cell adjacent in a main scanning direction orthogonal to the sub scan direction.

8. The image processing apparatus of claim 1, wherein the correction circuitry is further configured to set correction values of pixels in only those half-tone cells determined to be correction targets, based on corresponding correction value data of the correction value data stored in the memory.

9. The image processing apparatus of claim 8, wherein the correction circuitry is further configured to calculate final correction value data based on the stored correction value data and a result of determining which of the half-tone cells are correction targets.

10. The image processing apparatus of claim 1, wherein the correction circuitry is further configured to correct pixels in a half-tone cell adjacent to the particular half-tone cell in the sub scan direction, using a different correction value than used for the particular half-tone cell.

* * * * *